(12) United States Patent
Kim

(10) Patent No.: US 9,078,283 B2
(45) Date of Patent: Jul. 7, 2015

(54) MOBILE CONVERGENCE TERMINAL

(71) Applicant: Franklin Wireless Corporation, San Diego, CA (US)

(72) Inventor: Ok Chae Kim, San Diego, CA (US)

(73) Assignee: Franklin Wireless Corporation, San Diego, CA (US)

( * ) Notice: Subject to any disclaimer, the term of this patent is extended or adjusted under 35 U.S.C. 154(b) by 155 days.

(21) Appl. No.: 13/679,757

(22) Filed: Nov. 16, 2012

(65) Prior Publication Data

US 2014/0141834 A1  May 22, 2014

(51) Int. Cl.
*H04W 4/02* (2009.01)
*H04W 88/06* (2009.01)
*H04M 7/12* (2006.01)

(52) U.S. Cl.
CPC ............ *H04W 88/06* (2013.01); *H04M 7/1235* (2013.01); *H04M 2250/04* (2013.01); *H04M 2250/06* (2013.01); *H04M 2250/66* (2013.01)

(58) Field of Classification Search
USPC ............. 455/522.1; 707/206; 379/26; 348/77
See application file for complete search history.

(56) References Cited

U.S. PATENT DOCUMENTS

2013/0322607 A1* 12/2013 Crawford ........................ 379/76

* cited by examiner

*Primary Examiner* — Diane Mizrahi
(74) *Attorney, Agent, or Firm* — Knobbe, Martens, Olson & Bear, LLP

(57) ABSTRACT

A mobile convergence terminal is disclosed. In one aspect, the terminal includes a subscriber line interface configured to communicate with a plain old telephone service (POTS) phone and generate a first POTS call based on an input to the POTS phone. The terminal also includes a processor configured to selectively initiate a first type of wireless call or a second type of wireless call based at least in part on the input to the POTS phone and the first POTS call, wherein the first and second types of wireless call are different from each other.

32 Claims, 8 Drawing Sheets

MOBILE CONVERGENCE TERMINAL

BACKGROUND

1. Field

The described technology generally relates to a wireless terminal, for example, a mobile convergence terminal for providing a landline-like telephone service to users of a plain old telephone service (POTS) phone.

2. Description of the Related Technology

With the proliferation of wireless voice and high speed internet service by commercial cellular service providers, an increasing number of users are discontinuing their regular landline telephone services and/or Internet service and turning to commercial cellular services. Furthermore, for the users in a remote area where landline service is unavailable, they are forced to use wireless protocols provided by commercial network providers for voice (telephone) and data services.

However, despite the decreasing number of landline telephone service subscribers, many subscribers are still reluctant to discontinue their landline service because they want to maintain their existing phone numbers or keep their home phones as a primary communication method.

SUMMARY

The devices, systems, and methods of the present disclosure have several features, no single one of which is solely responsibly for its desirable attributes. Without limiting the scope of this invention as expressed by the claims which follow, its more prominent features will now be discussed briefly. After considering this discussion, and particularly after reading the section entitled "Detailed Description," one will understand how the features of this disclosure provide several advantages over current communication technology.

One inventive aspect is a mobile convergence terminal comprising: a communication port configured to be connected to a plain old telephone service (POTS) phone; a subscriber line interface configured to generate a first POTS call based on an input to the POTS phone and/or provide a second POTS call to the POTS phone; a wireless wide area network (WWAN) transceiver configured to wirelessly communicate WWAN data via a WWAN protocol, wherein the WWAN data comprises a voice over Internet protocol (VoIP) call; an application processor configured to perform a call conversion between the VoIP call and the POTS calls; a near field communication (NFC) processor configured to wirelessly control, via an NFC protocol, at least one mobile phone to make and/or receive a mobile call; a wireless local area network (WLAN) processor configured to wirelessly communicate data with a computing device via the WLAN protocol; and a main processor configured to selectively initiate either the VoIP call or the mobile call based at least in part on the input to the POTS phone and the first POTS call.

Another aspect is a mobile convergence terminal comprising: a subscriber line interface configured to communicate with a plain old telephone service (POTS) phone and generate a first POTS call based on an input to the POTS phone; and a processor configured to selectively initiate a first type of wireless call or a second type of wireless call based at least in part on the input to the POTS phone and the first POTS call, wherein the first and second types of wireless call are different from each other.

Another aspect is a method of operating a mobile convergence terminal (MCT) that is in data and/or signal communication with a plain old telephone service (POTS) phone, the method comprising: generating a first POTS call based on an input to an MCT; and controlling the MCT to selectively initiate a first type of wireless call or a second type of wireless call based at least in part on 1) the input to the POTS phone and 2) the first POTS call, wherein the first and second types of wireless call are different from each other.

Another aspect is one or more processor-readable storage devices having processor-readable code embodied on the processor-readable storage devices, the processor-readable code for programming one or more processors to perform a method of operating a mobile convergence terminal (MCT) that is in data and/or signal communication with a plain old telephone service (POTS) phone, the method comprising: generating a POTS call based on an input to an MCT; and controlling the MCT to selectively initiate a first type of wireless call or a second type of wireless call based at least in part on 1) the input to the POTS phone and 2) the POTS call, wherein the first and second types of wireless call are different from each other.

Another aspect is a mobile convergence terminal (MCT) that is in data and/or signal communication with a plain old telephone service (POTS) phone, comprising: means for generating a POTS call based on an input to an MCT; and means for controlling the MCT to selectively initiate a first type of wireless call or a second type of wireless call based at least in part on 1) the input to the POTS phone and 2) the POTS call, wherein the first and second types of wireless call are different from each other.

Another aspect is a system for controlling a mobile convergence terminal (MCT) connected to a plain old telephone service (POTS) phone, the system comprising: a memory storing instructions; and a processor configured to execute the instructions so as to control the MCT to 1) generate a POTS call based on an input to the POTS phone and 2) selectively initiate a first type of wireless call or a second type of wireless call based at least in part on the input to the POTS phone and the POTS call, wherein the first and second types of wireless call are different from each other.

Another aspect is a mobile convergence terminal (MCT), comprising: a subscriber line interface configured to generate a first POTS call based on an input to the POTS phone and/or provide a second POTS call to the POTS phone; a wireless wide area network (WWAN) transceiver configured to wirelessly communicate WWAN data via a WWAN protocol, wherein the WWAN data comprises a voice over Internet protocol (VoIP) call; and a processor configured to perform a call conversion between the VoIP call and the POTS calls.

BRIEF DESCRIPTION OF THE DRAWINGS

The above mentioned and other features of this disclosure will now be described with reference to the drawings of several embodiments of the present mobile convergence terminal, systems, and methods of use. The illustrated embodiments of the terminal, systems, and methods are intended to illustrate, but not to limit the disclosure. The drawings contain the following figures.

DETAILED DESCRIPTION

Figure 1:
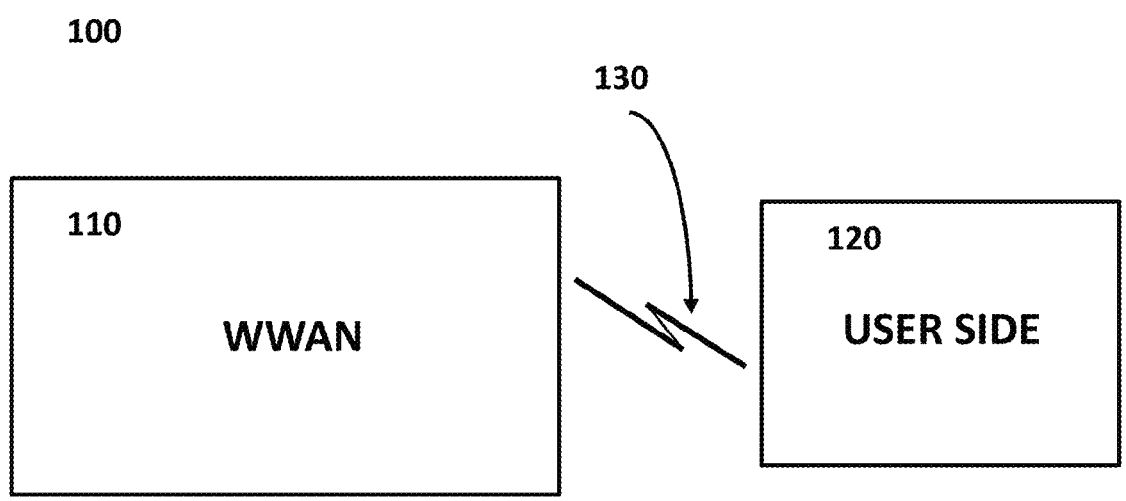
FIG. 1 illustrates a system for processing wireless calls for a landline telephone according to one embodiment of the present invention.

Embodiments will be described with respect to the accompanying drawings. Like reference numerals refer to like elements throughout the detailed description.

FIG. 1 illustrates a system 100 for processing wireless calls for a landline telephone according to one embodiment. The system 100 includes a wireless wide area network (WWAN) 110 and a user side 120. The user side 120 may communicate voice and/or data with the WWAN 110 via a WWAN signal or protocol 130. In one embodiment, the WWAN protocol 130 includes the third generation (3G) or fourth generation (4G) wireless protocols such as code division multiple access (CDMA), global system for mobile (GSM), evolution data only (EVDO), high speed packet access (HSPA), high speed uplink packet access (HSDPA), high speed downlink packet access (HSDPA), evolved HSPA (HSPA+), long term evolution (LTE) and worldwide interoperability for microwave access (WiMax). The WWAN protocol 130 may also include other wireless protocols that carry at least voice over Internet protocol (VoIP) signals and are distinguished from the wireless protocols used in the limited network described below. VoIP may include VoLTE (VoIP over LTE), VoWiMax (VoIP over WiMax) or mobile VoIP. The WWAN 110 may also include any other network other than a limited network described below.

In one embodiment, the user side 120 is located at one's residence, an office building or other structure which is covered by, for example, a wireless local area network (WLAN or Wi-Fi according to IEEE 802.11 b/g/n) or a near field communication (NFC) network such as Bluetooth or Zigbee (hereinafter, to be interchangeably used with a limited network). The NFC network may also include other different wireless technologies enabling a short distance point-to-point communication.

The user side 120 may also be located in an area where a landline phone service is unavailable or in an area where users have voluntarily discontinued their landline phone services. The landline phone service is generally known as a plain old telephone service (POTS) and a landline phone is frequently referred to as a POTS phone. The landline phone may include a cord phone or a cordless phone.

The user side 120 may include a landline phone and process voice and/or data communication between the landline phone and the WWAN 110. The user side 120 may also include at least one mobile phone, and process voice and/or data communication between the landline phone and the mobile phone. In one embodiment, the user side 120 processes voice and/or data communication between the landline phone and at least one of the WWAN 110 and the mobile phone.

In certain embodiments, the user side 120 processes at least one first type of wireless call and at least one second type of wireless call that is different from the first type of wireless call. The user side 120 may distinguish the first type of wireless call from the second type of wireless call based on various factors including, but not limited to, a communication range (e.g., WWAN or limited network), a bandwidth, a communication speed, a quality of service and a type of communication data (e.g., voice or VoIP), a wireless service provider, a user setting and/or other distinguishing factors.

In one embodiment, the coordination program and/or processor that controls the user side 120 is located in the user side 120. In another embodiment, the coordination program and/or processor is located in the WWAN 110 (e.g., a base station server). In still another embodiment, the coordination program and/or processor is located in another location (e.g., the mobile terminal 150 or a computing device 160 shown in FIG. 2).

Figure 2:
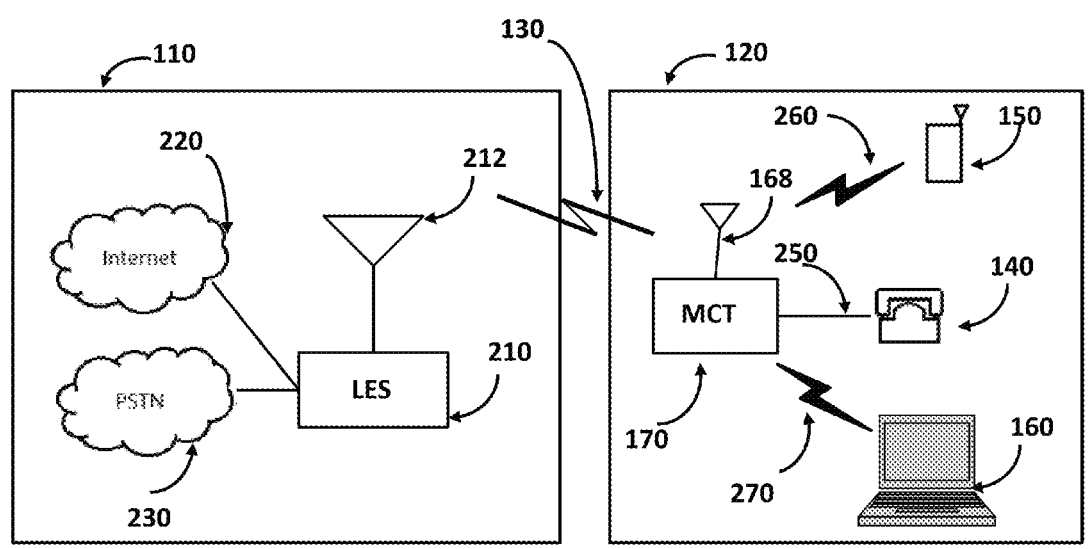
FIG. 2 illustrates an example configuration of the system from FIG. 1 and which includes a mobile convergence terminal according to one embodiment.

FIG. 2 illustrates an example configuration of the FIG. 1 system according to one embodiment. In the FIG. 2 embodiment, the WWAN 110 includes a landline exchange server (LES) 210, an Internet 220 and a public switched telephone network (PSTN) 230. The LES 210 may be a base station or any other device that can wirelessly communicate voice and/or data with the user side 120. The LES 210 includes a transceiver 212 that receives from and transmits voice and/or data to the user side 120 in the form of a WWAN signal 130. Although FIG. 2 shows only one base station, the WWAN 110 may include a plurality of base stations that wirelessly communicate data with the user side 120.

The user side 120 includes a POTS phone 140, at least one mobile phone 150, at least one computing device 160 and a mobile convergence terminal (MCT) 170. In one embodiment, the POTS phone 140 is not connected to a typical telephone plug and the POTS phone's users do not, or are unable to, subscribe to landline phone service from a telephone company. Instead, in the FIG. 2 embodiment, the POTS phone 140 is connected to the MCT 170. This connection can be via a telephone cable 250 such as, for example, a RJ11 cable. A Registered Jack (RJ) is a standardized physical network interface (both jack construction and wiring pattern) for connecting telecommunication equipment to a local exchange carrier or long distance carrier. The standard designs for these connectors and their wiring are generally referred to as RJ11, RJ14, RJ21, RJ45, RJ48, etc. The RJ11 type connection is the standard interface commonly used in North America and other area for POTS phone connections. In one embodiment, as long as the MCT 170 is powered on, the POTS phone 140 receives power from the MCT 170. The MCT 170 may have a physical USB interface configured to provide power to the mobile phone 150.

The mobile phone 150 may perform voice and/or data communication with the MCT 170 via an NFC signal or protocol 260 such as Bluetooth or Zigbee. Although not shown in FIG. 2, the mobile phone 150 may wirelessly communicate a voice signal with the WWAN 110 via, for example, the 3G or 4G wireless protocols as described above. The mobile phone 150 may include any portable terminal, which can perform wireless voice/data communication, such as a cellular phone or a smart phone.

Figure 8:
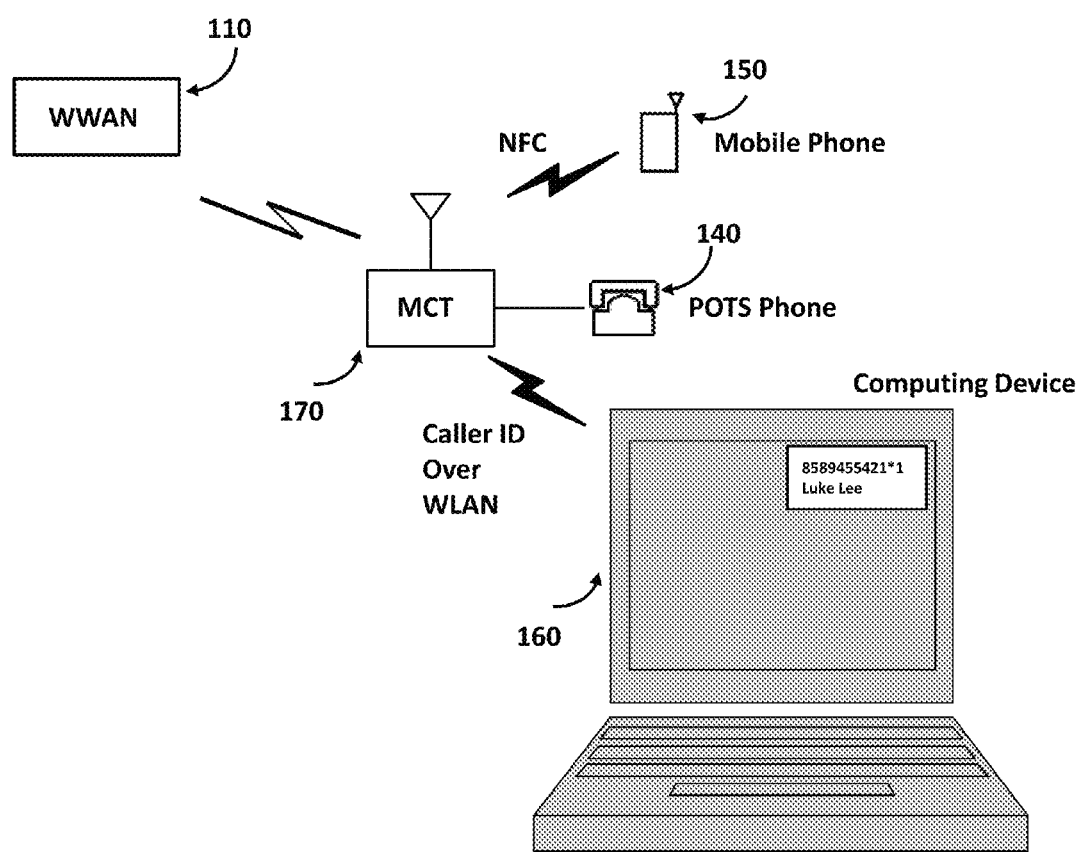
FIG. 8 illustrates a computing device from the system illustrated in FIG. 2 displaying a caller ID and a connection ID according to one embodiment.

The computing device 160 may wirelessly communicate data with the MCT 170 via a WLAN signal or protocol 270 such as Wi-Fi. Although not shown in FIG. 2, the computing device 160 may be connected to and communicate data with the MCT 170 via a physical connection (e.g., universal serial bus (USB)). In one embodiment, as shown in FIG. 8, the computing device 160 may display call information such as a caller ID/connection ID (to be described in detail) and the caller's name. The computing device 160 may have a background process program such as a daemon software program to display the received caller ID information on the screen. The computing device 160 can be any computing device, including but not limited to, a desktop computer, a laptop computer, a tablet computer, a personal digital assistant or any other computing device that can wirelessly or connectedly (e.g., via a USB port) communicate data with the MCT 170.

The MCT 170 can be a fixed mobile convergence terminal (FMCT). However, the MCT 170 does not have to be fixed to one location and can be moved from location to location. The MCT 170 may include a transceiver 168 which wirelessly communicates voice and/or data with the WWAN 110 via the WWAN protocol 130 and with the mobile phone 150 via the NFC protocol 260.

The MCT 170 may provide a landline-like POTS service to the phone 140. For example, the MCT 170 allows users of the phone 140 to make or receive calls in the same manner as they would with regular landline service. In one embodiment, the MCT 170 has its own phone number, for example, assigned by a commercial cellular service provider. For outgoing calls from the phone 140, the MCT 170 may simulate a POTS signal and selectively convert the POTS signal to either a WWAN signal 130 or an NFC signal 260. For incoming calls dialed to the MCT 170 or the mobile phone 150, the MCT 170 may selectively convert a WWAN signal 130 or an NFC signal 260 to a POTS signal. The MCT 170 may also wirelessly transmit call information (e.g., caller ID and connection ID) as shown in FIG. 8 to the computing device 160 via the WLAN signal 270 so that the computing device 160 can display the call information.

Figure 3:
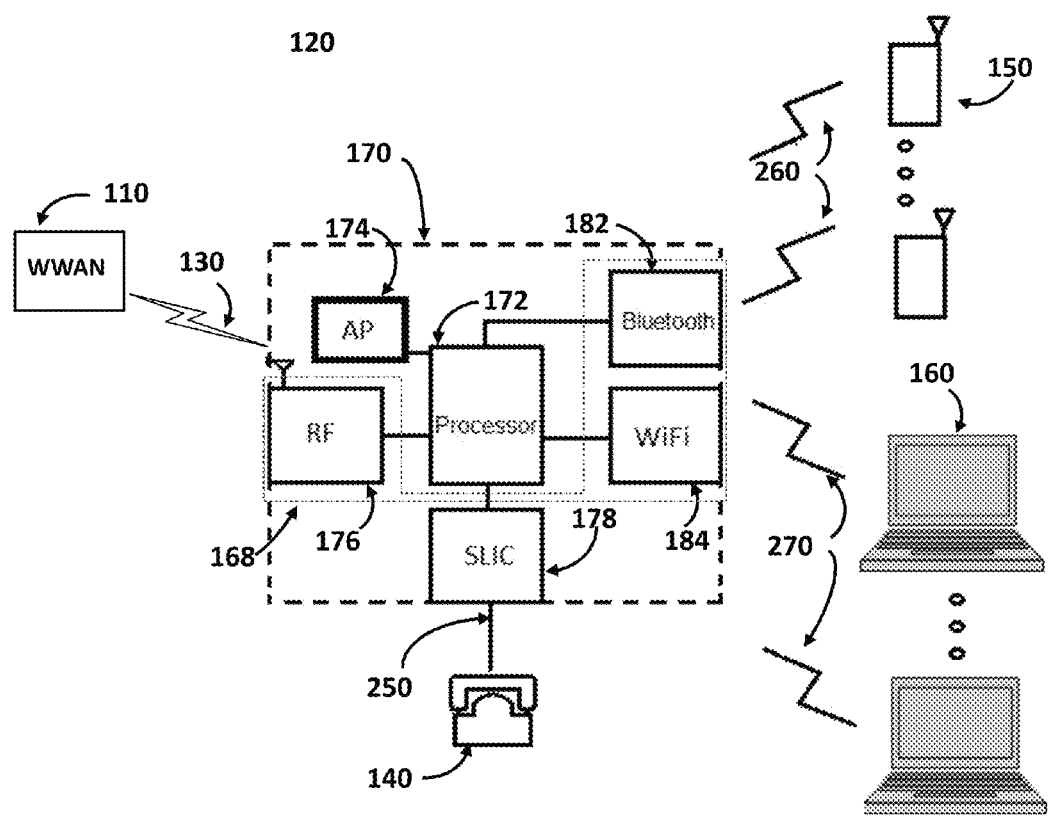
FIG. 3 illustrates an example configuration of the mobile convergence terminal of FIG. 2 according to one embodiment.

FIG. 3 illustrates an example configuration of the MCT 170 according to one embodiment. In certain embodiments, the MCT 170 includes a processor 172, an application processor (AP) 174, a radio frequency (RF) unit 176, a subscriber line interface card (SLIC) 178, a Bluetooth processor 182 and a WiFi processor 184. Depending on the embodiment, certain elements may be removed from or additional elements may be added to the system illustrated in FIG. 3. Furthermore, two or more elements may be combined into a single element, or a single element may be realized as multiple elements. This applies to the remaining embodiments. For example, the AP 174, the Bluetooth processor 182 and WiFi processor 184 can be incorporated into the processor 172.

The SLIC 178 may simulate landline phone communication to provide a POTS-like service to the POTS phone 140 connected to the MCT 170. For example, the SLIC 178 generates a ringing current (e.g., DC 48V loop voltage and current) and detects a dual tome multi frequency (DTMF) signal received from the POTS phone 140 when a user presses keypads or dials, and converts the DTMF signal into dialed numbers that can be processed by the processor 172. The SLIC 178 may interface the twisted pair cable of a POTS local loop to the PSTN. Furthermore, the SLIC 178 may also perform other tasks, such as analog-to-digital and digital-to-analog conversion of voice, off-hook detection, ring supervision, line integrity tests, and other BORSCHT functions (Battery supply to subscriber line, Overvoltage protection, Ringing current supply, Supervision of subscriber terminal, Coder and decoder, Hybrid 2 wire to 4 wire conversion and Testing). The SLIC 178 may also generate ring tones and caller ID data to be transmitted to the POTS phone 140 based on the caller ID information. The caller ID information may be provided from the processor 172 that has received WWAN VoIP calls sent via the WWAN protocol 130 or mobile phone calls sent via the NFC protocol 260.

The POTS phone 140 may ring and display a caller ID upon detecting ring tones and receiving caller ID data from the SLIC 178. As discussed above, the computing device 160 may also display the caller ID information wirelessly or connectedly received from the MCT 170 as shown in FIG. 8. This function is useful when the POTS phone 140 cannot display the call information.

The AP 174 may perform a call (signal) conversion between a POTS call (signal) and a WWAN VoIP call (signal). In one embodiment, in an incoming call from the WWAN 110, the AP 174 converts a VoIP call to a POTS call that is processed in the processor 172 and SLIC 178 and provided to the POTS phone 140. In one embodiment, in an outgoing call from the POTS phone 140, the AP 174 converts the POTS call originated from the phone 140 and the SLIC 178 to a VoIP call which is transmitted to the WWAN 110. The AP 174 may also process a VoIP session initiation protocol (SIP).

The RF unit 176 includes a radio unit that wirelessly communicates data with the WWAN 110 via the WWAN protocol. The Bluetooth processor 182 performs voice and/or data communication between the POTS phone 140 and the mobile terminal 150 via the NFC protocol 260 such as Bluetooth or Zigbee.

The WiFi processor 184 performs data communication between the processor 172 and the computing device 160 via the WLAN protocol 270. For example, the WiFi processor 184 converts WWAN data to WLAN data and vice versa, and communicates the WLAN data with the computing devices 160. This way, the MCT 170 may allow the computing device 160 to access the Internet via the WLAN protocol 270 and can act as a Wi-Fi hotspot for the computing device 160. For example, as discussed above, the computing device 160 can display incoming call information (See FIG. 8). This call information can also be displayed on the POTS phone 140.

The processor 172 controls the overall function of the MCT 170, including but not limited to, base band signal processing, controlling the operations of the AP 174, the RF unit 176, the SLIC 178, the Bluetooth processor 182 and the WiFi processor 184. In one embodiment, users of the POTS phone 140 may set or designate one of the WWAN call or mobile call as a primary connection. The processor 172 stores the designation information and processes the wireless calls based on the stored designation information. For example, for an outgoing call, the processor 172 may initiate a WWAN VoIP call or order the mobile phone 150 to make a mobile call. Also, for an incoming call, the processor 172 may receive a WWAN VoIP call from the WWAN 110 or a mobile call from the mobile phone 150 and relay the received call to the SLIC 178 which simulates a regular landline call for the POTS phone 140. The processor 172 may store a program or a module that performs at least some of the operations illustrated in the flowcharts of FIGS. 5-7. The program or module may be stored in other than the MCT 170, for example, a base station or server of the WWAN 110, the mobile terminal 150 or the computing device 160.

Figure 4:
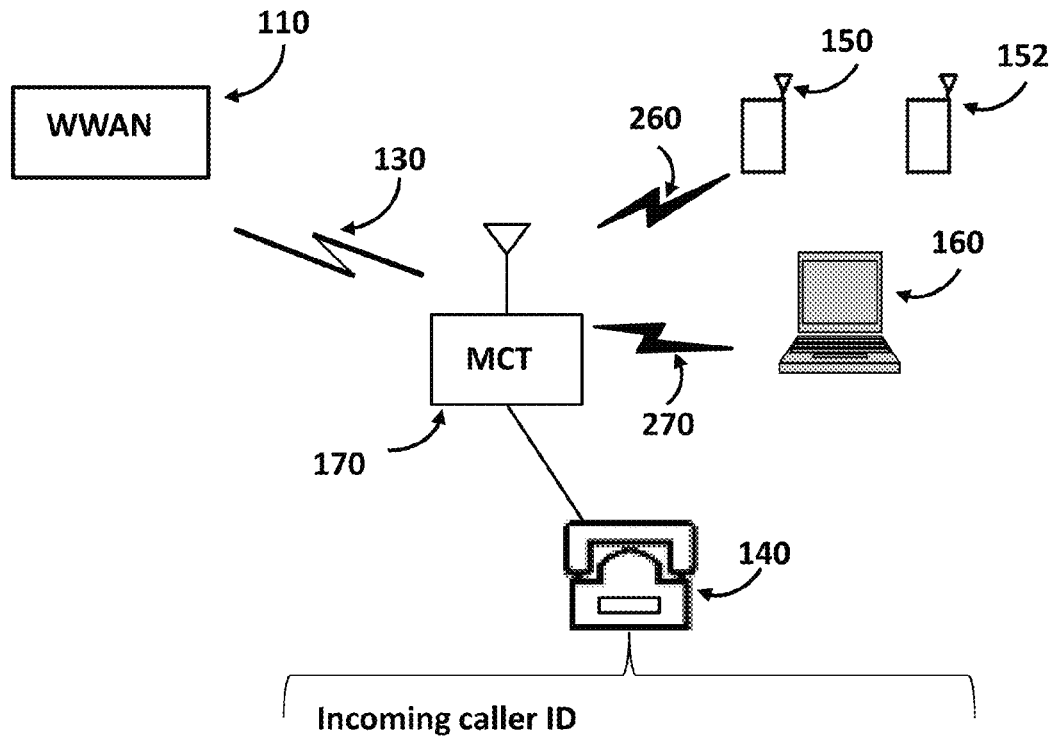
FIG. 4 is a conceptual diagram illustrating an example operation of the mobile convergence terminal according to one embodiment.

FIG. 4 is a conceptual diagram illustrating an example operation of the mobile convergence terminal 170 according to one embodiment. Users of the POTS phone 140 can receive or make calls through their mobile phones 150 and 152 from their home (or office) phone 140 by placing their mobile phones 150 and 152 in the coverage of the NFC signal 260 and pairing the NFC protocol (Bluetooth, for example) and their mobile phones 150 and 152. In one embodiment, the MCT 170 has two separate wireless connections to make or receive voice calls: one is a VoIP call over the WWAN protocol 130, and the other is a mobile call from the phones 150 and 152, which are paired with the MCT 170, over the Bluetooth protocol 260. Although only two mobile phones 150 and 152 are illustrated in FIG. 4, additional mobile phones can be paired with the MCT 170.

In order to provide users with POTS line-like experience, the MCT 170 may manage outgoing calls via both of the connection interfaces (WWAN, NFC) and incoming calls from both of the connections to be controlled by the single SLIC 178. The users may experience a single landline connection for both interfaces, even though they do not subscribe to a landline phone.

The MCT 170 may modify incoming caller IDs and dialed destination numbers in order to distinguish incoming calls through the WWAN protocol 130 and through the mobile phones 150 and 152 paired with the MCT 170 over the NFC connection 260. In one embodiment, if a VoIP call over the WWAN protocol 130 is pre-configured as the primary connection and there is an incoming call through the WWAN protocol 130, the MCT 170 conveys the original incoming caller ID 410 without modification to the POTS phone 140. In this embodiment, if there is an incoming call from one of the mobile phones 150 and 152 through the NFC connection 260, the MCT 170 adds a special prefix (* or # or others) and phone ID (hereinafter to be interchangeably used with a connection ID) to the original caller ID 410 for the POTS phone 140/the computing device 160 to display. Reference numeral 420 in FIG. 4 represents the combination ("*1" or "*2") of the prefix and connection ID. In one embodiment, the connection ID numbers are assigned by the MCT 170 when the mobile phones 150 and 152 are paired with the MCT 170 through the NFC connection 260. In one embodiment, when users redial the caller ID numbers from the call history log of the POTS phone 140, the MCT 170 decides which connection to use to make the call by the connection ID 420. If there is no connection ID found in the caller ID string, the MCT 170 may make calls through the primary connection (in this example, through a VoIP call over the WWAN connection 130) that is pre-configured by the user.

Figure 5:
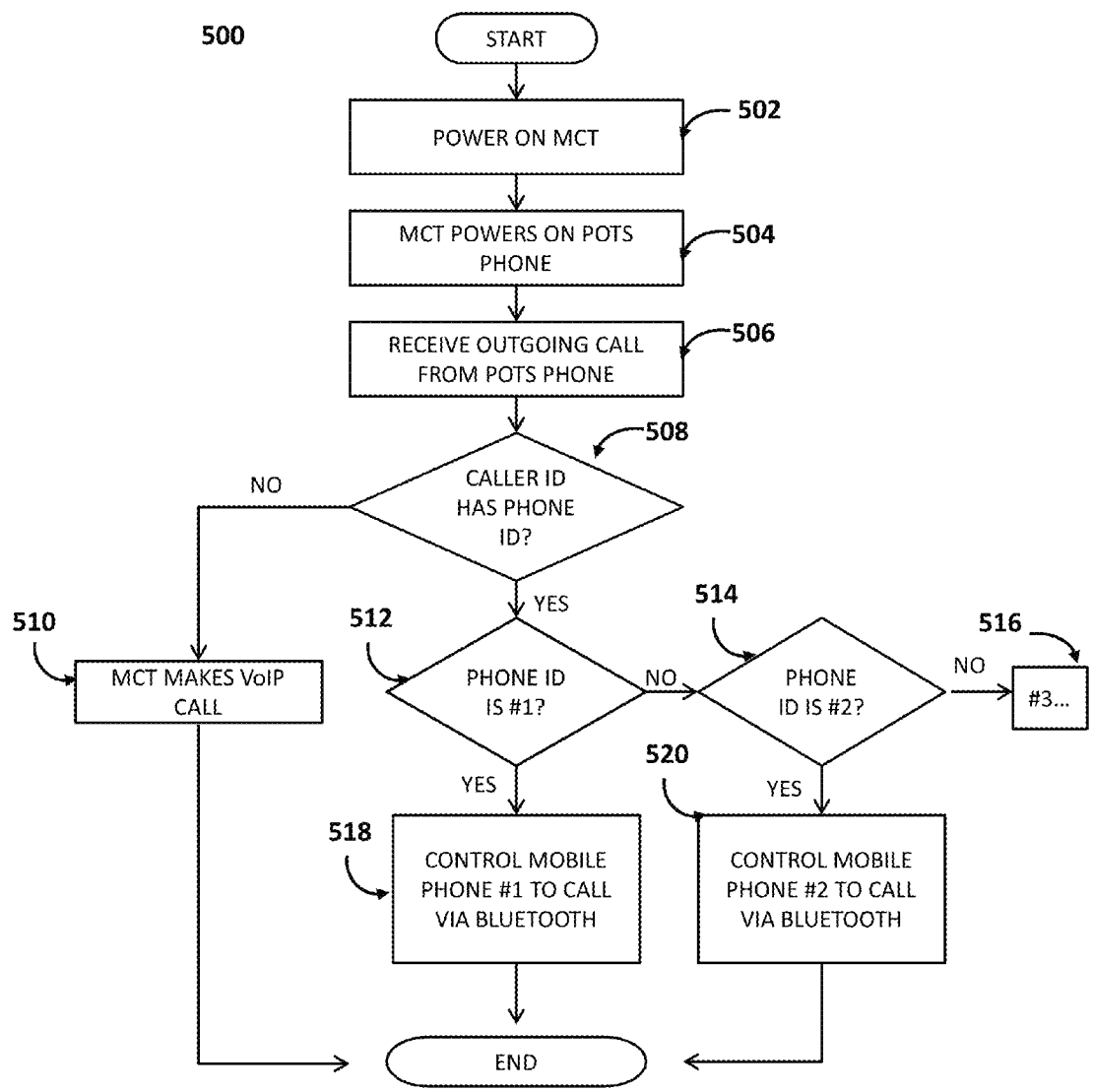
FIG. 5 is a flowchart showing an example outgoing call operation of the mobile convergence terminal according to one embodiment.
Figure 6:
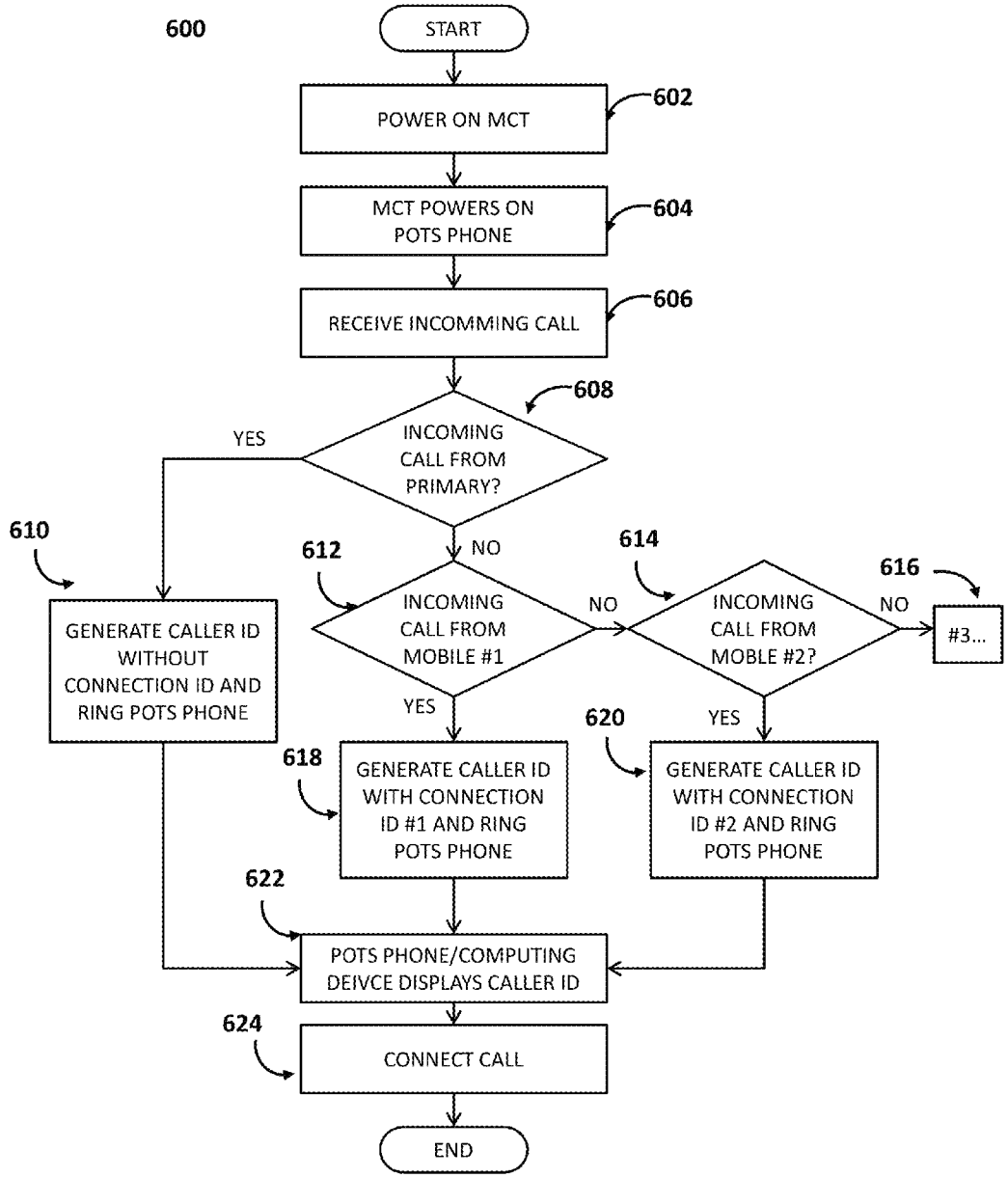
FIG. 6 is a flowchart showing an example incoming call operation of the mobile convergence terminal according to one embodiment.
Figure 7:
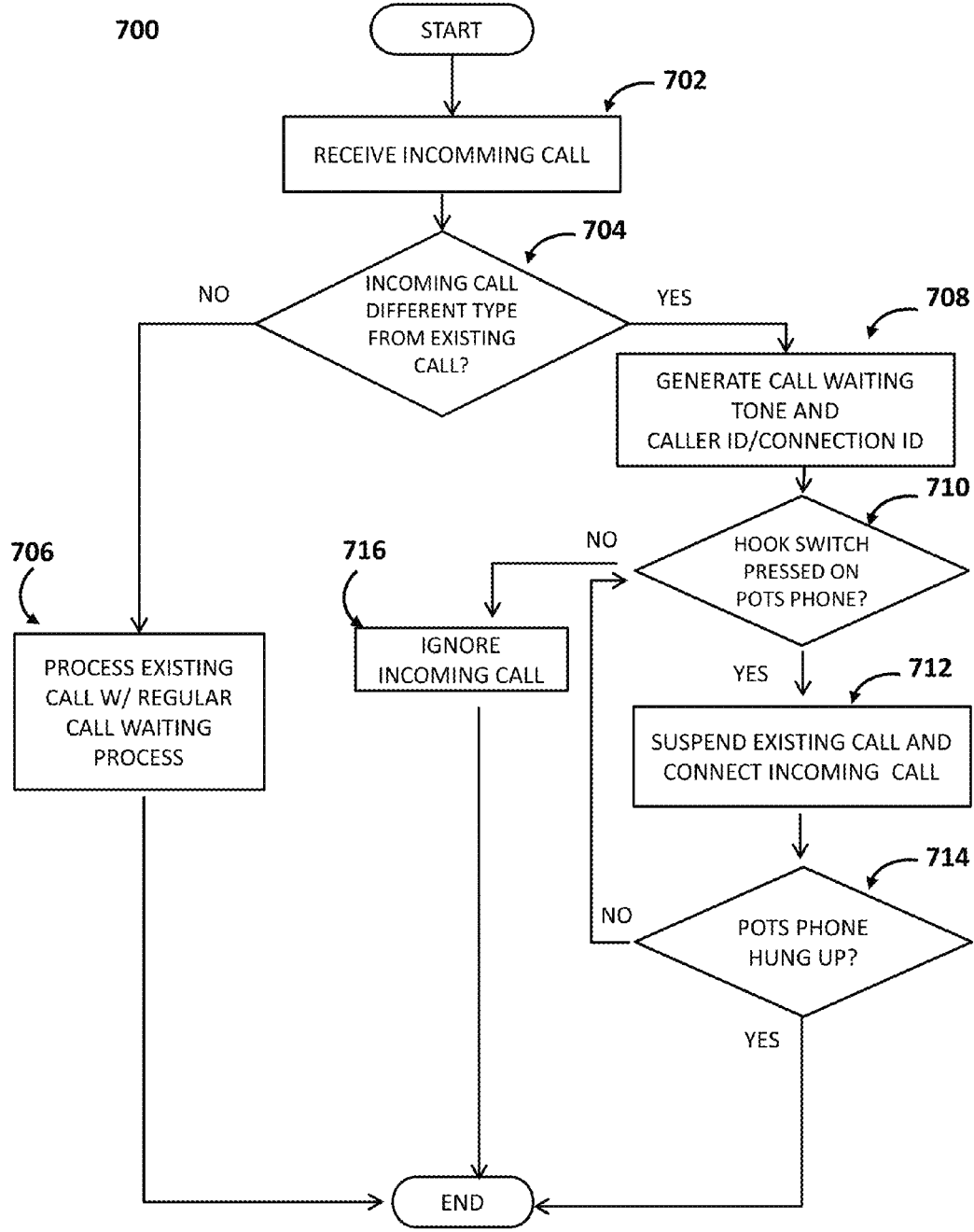
FIG. 7 is a flowchart showing an example incoming call operation of the mobile convergence terminal according to another embodiment.

FIG. 5 is a flowchart showing an example outgoing call operation 500 performed by the MCT 170 according to one embodiment. FIG. 6 is a flowchart showing an example incoming call operation 600 performed by the MCT 170 according to one embodiment. FIG. 7 is a flowchart showing an example incoming call operation 700 performed by the MCT 170 according to another embodiment.

In one embodiment, each of the procedures 500-700 of FIGS. 5-7 (or at least part of the procedure) is implemented in a conventional programming language, such as C or C++ or another suitable programming language. In one embodiment, the program is stored on a computer accessible storage medium of the MCT 170, for example, a memory (not shown) of the MCT 170 or the main processor 172. In another embodiment, the program can be stored in other system locations so long as it can perform at least part of one or more of the procedures 500-700. The other system locations may include the computing device 160, a server or base station of the WWAN 110 or a mobile phone 150 and 152. In still another embodiment, part of the program is stored in one system location and the remaining program is stored in another location, so that the separate programs together perform at least part of one or more of the procedures 500-700 of FIGS. 5-7.

In another embodiment, the program is stored in a separate storage medium. The storage medium may comprise any of a variety of technologies for storing information. In one embodiment, the storage medium comprises a random access memory (RAM), hard disks, floppy disks, digital video devices, compact discs, video discs, and/or other optical storage mediums, etc. In another embodiment, at least one of the main processor 172 and the AP processor 174 is configured to or programmed to perform at least part of at least one of the above procedures 500-700. The program may be stored in the processor. In various embodiments, the processor may have a configuration based on, for example, i) an advanced RISC machine (ARM) microcontroller and ii) Intel Corporation's microprocessors (e.g., the Pentium family microprocessors). In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 7/Vista/2000/9x/ME/XP, Macintosh OS, OS/2, Android, iOS and the like. In another embodiment, at least part of each of the procedures 500-700 can be implemented with embedded software. Depending on the embodiment, additional states may be added, others removed, or the order of the states changes in each of FIGS. 5-7. Referring to FIGS. 4-7, an example operation of the MCT 170 will be described.

Outgoing Call Procedure

Referring to FIG. 5, an example outgoing call procedure 500 of the MCT 170 will be described. For the purpose of convenience, it is assumed in FIGS. 5 and 6 that the WWAN call (or a VoIP call) has been set as a primary connection. In the embodiments of FIGS. 5 and 6, the primary call (here, WWAN VoIP call) does not have a connection ID added to a caller ID whereas the secondary call (here, mobile call) has the connection ID. However, depending on the embodiment, it is possible that the primary connection has a connection ID added to the caller ID whereas the secondary call does not have the connection ID.

In state 502, the MCT 170 is powered on. The MCT 170 may be powered on by a separate power source (e.g., electrical outlet). The MCT 170 may also be powered on via an internal power source such as a renewable/rechargeable energy source (a secondary battery, solar cell or fuel cell) or a non-renewable/non-rechargeable energy source such as a primary battery. In state 504, the MCT 170 powers on the POTS phone 140. As described above, if the POTS phone 140 is connected to the MCT 170 via the telephone cable such as an RJ11 cable, the POTS phone is powered on, assuming that the MCT 170 has already been powered on. The states 502 and 504 may be omitted.

In state 506, the MCT 170 receives an outgoing call from the POTS phone 140. In state 508, the MCT 170 determines whether the caller ID 410 has a phone ID or a connection ID 420. In one embodiment, as shown in FIG. 4, the caller ID 410 includes a phone number "1234567890" that the sender dialed or pressed. The caller ID may further include identity information of the caller (e.g., name). In this embodiment, the number "1" and "2" 420 represent the phone ID or connection ID, as shown in FIG. 4. The mobile phone 150 may be set as a #1 phone and the mobile phone 152 may be set as a #2 phone. A prefix may be added between the original caller ID (phone number) and the connection ID so as to distinguish the phone number from the connection ID. The prefix may be a character (e.g., * or #), a number (e.g., 0 or 00) or a combination thereof (e.g., #0, *0). Examples of the combination of the prefix and connection ID include *1 or *2, #1 or #2, 1 or 2, ##1 or ##2, *#1 or *#2, #*1 or #*2, 01 or 02, 001 or 002, 11 or 12, 21 or 22, etc. In another embodiment, the combination of the prefix and phone ID has another format that can distinguish the primary connection from the secondary connection. In still another embodiment, the MCT 170 includes a special button that separates the connection ID from the caller ID. In another embodiment, the original caller ID and connection ID may be separated by a lapse of time. For example, if 1 or 2 is entered within a few seconds (e.g., about 1-4 seconds) after the original caller ID has been entered, the MCT 170 may recognize the combination of the time delay (here, 1-4 seconds) and number (here, 1 or 2) as a secondary call.

If the MCT 170 determines that the caller ID does not have a phone ID, the MCT 170 makes a VoIP call via the WWAN protocol 130, since no phone ID means that the outgoing call is to be made via the primary connection (here VoIP via the WWAN protocol 130) (state 510). In this state, the processor 172 of the MCT 170 initiates a WWAN call (VoIP call) over the WWAN protocol 130. If the MCT 170 determines that the caller ID has a phone ID, it is determined in state 512 whether the phone ID is #1. If the phone ID is #1, the MCT 170 controls the mobile phone #1 to make a wireless call via the Bluetooth protocol 260 (state 518). If the MCT 170 determines that the phone ID is not #1, it is determined in state 514 whether the phone ID is #2. If the phone ID is #2, the MCT 170 controls the mobile phone #2 to make a wireless call via the Bluetooth protocol 260 (state 520). If the MCT 170 determines that the phone ID is not #2, it is determined in state 516 whether the phone ID is #3. The MCT 170 can continue to determine the phone IDs of the remaining mobile phones assigned by and paired with the MCT 170, and control the corresponding mobile phones to make a call via the Bluetooth protocol 260. As described above, the wireless call may be transmitted from the mobile phones 150 and 152 to the WWAN 110.

In one embodiment, the caller ID numbers with the phone ID/connection ID is for internal processing only and all of those numbers are removed when the MCT 170 actually produces an outgoing call.

Incoming Call Procedure 1

Referring to FIG. 6, an example incoming call procedure 600 of the MCT 170 will be described. In states 602 and 604, the MCT 170 is powered on and the MCT 170 powers on the POTS phone 140.

In state 606, the MCT 170 receives an incoming call. In state 608, the MCT 170 determines whether the incoming call comes from the primary connection (here, WWAN call). If the MCT 170 determines that the incoming call comes from the primary connection, the MCT 170 generates a caller ID without a phone ID or connection ID (state 610). In this situation, as shown in FIG. 4, the caller ID 410 is "1234567890" which allows a user to recognize the call is incoming from the primary connection. Furthermore, the processor 172 and the SLIC 178 can ring the POTS phone 140 (state 610).

In one embodiment, the SLIC 178 generates a caller ID with or without prefix (* or #) and a phone ID/connection ID based on the caller ID information the MCT processor 172 received from a WWAN call or a mobile call. For example, if a VoIP call via the WWAN connection is set as the primary connection, the SLIC 178 generates a ring tone and a caller ID signal without prefix. If there is an incoming calls from the mobile phones 150 and 152 paired with the MCT 170 via the Bluetooth protocol, the SLIC 178 generates ring tones and a caller ID with prefix (e.g., * or #) and a connection ID of the mobile phone to which the incoming call was directed, for users to recognize the call is incoming from a specific mobile phone. The connection IDs may be pre-configured to individual mobile phones while pairing over the Bluetooth. If the POTS phone 140 supports a caller ID display and call history log feature, users can redial the numbers with or without prefix and phone ID, and make calls through the same connection from which they received the call.

If the MCT 170 determines that the incoming call does not come from the primary connection (i.e., comes from the secondary connection), it is determined in state 612 whether the incoming call comes from the mobile phone #1 (150). If so, the MCT 170 generates a caller ID with a connection ID (here, "1") and rings the POTS phone 140 (state 618). In this situation, as shown in FIG. 4, the generated/modified caller ID is "1234567890*1."

If the MCT 170 determines that the incoming call does not come from the mobile phone #1 (150), it is determined in state 614 whether the incoming call comes from the mobile phone #2 (152). If so, the MCT 170 generates a caller ID with a phone ID or connection ID (here, "2") and rings the POTS phone 140 (state 620). In this situation, as shown in FIG. 4, the generated/modified caller ID is "1234567890*2." The MCT 170 can continue to determine the phone IDs of the remaining mobile phones (state 616), and generate a caller ID with a corresponding connection ID and rings the POTS phone 140 (state 620).

In state 622, the POTS phone 140 and/or the computing device 160 displays the generated caller ID as shown in FIG. 8. Thereafter, the MCT 170 connects the call between the POTS phone 140 and one of the WWAN call and the mobile call (state 624).

Incoming Call Procedure 2

Referring to FIG. 7, an example incoming call procedure 700 of the MCT 170 will be described. In the FIG. 7 embodiment, a user of the POTS phone 140 is already using the phone (an existing call or a first incoming call that may be either VoIP call via the WWAN connection or a mobile call via the NFC connection).

In state 702, the MCT 170 receives an incoming call (or a second incoming call). In state 704, the MCT 170 determines whether the (second) incoming call is a different type from the existing call (first incoming call). For example, if the existing call has come from the WWAN connection and the incoming call is coming from the NFC connection, the MCT 170 determines that the incoming call is a different type from the existing call. However, in this example, if the existing call has come from the WWAN connection, the MCT 170 determines that the incoming call is not a different type from the existing call. As another example, if the existing call has come from the NFC connection and the incoming call is coming from the WWAN connection, the MCT 170 determines that the incoming call is a different type from the existing call. However, in this example, if the existing call has come from the NFC connection, the MCT 170 determines that the incoming call is not a different type from the existing call.

If the MCT 170 determines that the incoming call (second incoming call) is not a different type from the existing call (first incoming call), the MCT 170 processes the existing call with a regular call waiting process (for example, creating a call waiting tone) (state 706). If the MCT 170 determines that the incoming call is a different type from the existing call, the SLIC 178 of the MCT 170 generates a call waiting tone and a caller ID (with connection ID if applicable) (state 708). In state 710, the MCT 170 determines whether the hook switch of the POTS phone 140 has been pressed. If so, the MCT suspends the existing call and connects the incoming call (state 712). In state 714, the MCT 170 determines whether the POTS phone 140 has been hung up. If not, the MCT repeats states 710-714 until the POTS phone 140 has been hung up. If the MCT 170 determines that the hook switch of the POTS phone 140 has not been pressed, the MCT 170 ignores the incoming call (second incoming call) and continues to process the existing call (first incoming call). Users can press the hook on the POTS phone 140 for switching among the existing call and other calls waiting. The same scenario can be applied for the third incoming call and so on.

While the above description has pointed out features of various embodiments, the skilled person will understand that various omissions, substitutions, and changes in the form and details of the device or process illustrated may be made without departing from the scope of the appended claims.

What is claimed is:

1. A mobile convergence terminal comprising:
    a communication port configured to be connected to a plain old telephone service (POTS) phone;
    a subscriber line interface configured to generate a first POTS call based on an input to the POTS phone and/or provide a second POTS call to the POTS phone;
    a wireless wide area network (WWAN) transceiver configured to wirelessly communicate WWAN data via a WWAN protocol, wherein the WWAN data comprises a voice over Internet protocol (VoIP) call;
    an application processor configured to perform a call conversion between the VoIP call and the POTS calls;
    a near field communication (NFC) processor configured to wirelessly control, via an NFC protocol, at least one mobile phone to make and/or receive a mobile call;
    a wireless local area network (WLAN) processor configured to wirelessly communicate data with a computing device via the WLAN protocol; and
    a main processor configured to selectively initiate either the VoIP call or the mobile call based at least in part on the input to the POTS phone and the first POTS call.

2. The terminal of claim 1, wherein the main processor stores designation information which designates one of the VoIP call and the mobile call as a primary connection and designates the other as a secondary connection, and wherein the main processor is further configured to selectively convert the VoIP call or the mobile call to the second POTS call based at least in part on the designation information.

3. A mobile convergence terminal comprising:
    a subscriber line interface configured to communicate with a plain old telephone service (POTS) phone and generate a first POTS call based on an input to the POTS phone; and
    a processor configured to selectively initiate a first type of wireless call or a second type of wireless call based at least in part on the input to the POTS phone and the first POTS call, wherein the first and second types of wireless call are different from each other.

4. The terminal of claim 3, wherein the input to the POTS phone comprises at least one of a number and a character.

5. The terminal of claim 3, wherein the processor stores designation information which designates one of the two types of wireless call as a primary connection and designates the other type as a secondary connection.

6. The terminal of claim 5, wherein the processor is further configured to 1) selectively convert the first type of wireless call or the second type of wireless call into a second POTS call based on the designation information and 2) provide the second POTS call to the POTS phone.

7. The terminal of claim 6, wherein each of the first and second types of wireless call comprises a caller ID, and wherein the processor is further configured to modify the caller ID of the second POTS call designated as the secondary connection so as to add a connection ID thereto.

8. The terminal of claim 7, wherein the processor is further configured to control the POTS phone to display the modified caller ID.

9. The terminal of claim 7 further comprising a wireless local area network (WLAN) processor configured to wirelessly communicate with a computing device via a WLAN protocol, wherein the processor is further configured to transmit the modified caller ID to the computing device via the WLAN protocol.

10. The terminal of claim 6, wherein each of the first and second types of wireless call comprises a caller ID, and wherein the processor is further configured to maintain the caller ID of the second POTS call designated as the first connection.

11. The terminal of claim 5, wherein each of the first and second types of wireless call comprises a caller ID, wherein only one of the two types of wireless call comprises a connection ID, and wherein the processor is further configured to recognize the wireless call having the connection ID as the secondary connection.

12. The terminal of claim 3, wherein the processor is further configured to distinguish the first type of wireless call from the second type of wireless call based on at least one of the following factors: a communication range, a bandwidth, a communication speed, a quality of service, a type of communication data, a type of wireless service provider and a user setting.

13. The terminal of claim 3, wherein the first type of wireless call comprises a wireless call being communicated via a first communication protocol, and wherein the second type of wireless call comprises a wireless call being communicated via a second communication protocol different from the first communication protocol.

14. The terminal of claim 13, wherein the first communication protocol comprises a wireless wide area network (WWAN) protocol, and wherein the second communication protocol comprises a near field communication (NFC) protocol.

15. The terminal of claim 14, wherein the WWAN protocol comprises at least one of the following communication protocols: code division multiple access (CDMA), global system for mobile (GSM), evolution data only (EVDO), high speed packet access (HSPA), high speed uplink packet access (HSUPA), high speed downlink packet access (HSDPA), evolved HSPA (HSPA+), long term evolution (LTE) and worldwide interoperability for microwave access (WiMax).

16. The terminal of claim 14, wherein the NFC protocol comprises at least one of the following communication protocols: Bluetooth and Zigbee.

17. A method of operating a mobile convergence terminal (MCT) that is in data and/or signal communication with a plain old telephone service (POTS) phone, the method comprising:
    generating a first POTS call based on an input to an MCT; and
    controlling the MCT to selectively initiate a first type of wireless call or a second type of wireless call based at least in part on 1) the input to the POTS phone and 2) the first POTS call, wherein the first and second types of wireless call are different from each other.

18. The method of claim 17, further comprising storing designation information which designates one of the two types of wireless call as a primary connection and designates the other type as a secondary connection.

19. The method of claim 18, wherein the first POTS call is an outgoing call from the POTS phone, and wherein the method further comprises determining whether the first type or second type of wireless call is designated as the primary connection.

20. The method of claim 19, wherein each of the first and second types of wireless call comprises a caller ID, wherein the caller ID of one of the two types of wireless call comprises a connection ID, and wherein the determining is performed based on whether or not the first or second type of wireless call comprises the connection ID.

21. The method of claim 20, wherein the first type of wireless call is determined as the primary connection if the caller ID of the first type of wireless call does not comprise the connection ID, and wherein the method further comprises controlling the MCT to initiate the first type of wireless call via a first communication protocol.

22. The method of claim 20, wherein the second type of wireless call is determined as the primary connection if the caller ID of the second type of wireless call comprises the connection ID, and wherein the method further comprises:
communicating voice and/or data with at least one mobile terminal via a near field communication (NFC) protocol; and
controlling, via the NFC protocol, the at least one mobile terminal to initiate a wireless call.

23. The method of claim 22, further comprising removing the caller ID before the mobile terminal makes the wireless call.

24. The method of claim 17, further comprising:
designating one of the two types of wireless call as a primary connection and the other type as a secondary connection;
receiving an incoming call; and
determining whether the incoming call comes from a primary connection.

25. The method of claim 24, further comprising;
controlling the MCT to generate a caller ID without a connection ID; and
ringing the POTS phone in response to the incoming call coming from the primary connection.

26. The method of claim 24, further comprising:
controlling the MCT to generate a caller ID comprising a connection ID; and
ringing the POTS phone if the incoming call does not come from the primary connection.

27. The method of claim 26, further comprising displaying the caller ID on the POTS phone.

28. The method of claim 17, further comprising:
designating one of the two types of wireless call as a primary connection and the other type as a secondary connection;
receiving a first incoming wireless call;
receiving a second incoming wireless call while the first incoming call is still in session;
determining whether the second incoming call is a type of wireless call which is different from the first incoming call; and
controlling the MCT to generate a call waiting tone and a caller ID in response to the second incoming call being a different type of wireless call.

29. One or more processor-readable storage devices having processor-readable code embodied on the processor-readable storage devices, the processor-readable code for programming one or more processors to perform a method of operating a mobile convergence terminal (MCT) that is in data and/or signal communication with a plain old telephone service (POTS) phone, the method comprising:
generating a POTS call based on an input to an MCT; and
controlling the MCT to selectively initiate a first type of wireless call or a second type of wireless call based at least in part on 1) the input to the POTS phone and 2) the POTS call, wherein the first and second types of wireless call are different from each other.

30. A mobile convergence terminal (MCT) that is in data and/or signal communication with a plain old telephone service (POTS) phone, comprising:
processor means for generating a POTS call based on an input to an MCT; and
means for controlling the MCT to selectively initiate a first type of wireless call or a second type of wireless call based at least in part on 1) the input to the POTS phone and 2) the POTS call, wherein the first and second types of wireless call are different from each other.

31. A system for controlling a mobile convergence terminal (MCT) connected to a plain old telephone service (POTS) phone, the system comprising:
a memory storing instructions; and
a processor configured to execute the instructions so as to control the MCT to 1) generate a POTS call based on an input to the POTS phone and 2) selectively initiate a first type of wireless call or a second type of wireless call based at least in part on the input to the POTS phone and the POTS call, wherein the first and second types of wireless call are different from each other.

32. A mobile convergence terminal (MCT), comprising:
a subscriber line interface configured to generate a first POTS call based on an input to the POTS phone and/or provide a second POTS call to the POTS phone;
a wireless wide area network (WWAN) transceiver configured to wirelessly communicate WWAN data via a WWAN protocol, wherein the WWAN data comprises a voice over Internet protocol (VoIP) call; and
a processor configured to perform a call conversion between the VoIP call and the POTS calls.

* * * * *